United States Patent
Tame

(10) Patent No.: US 6,715,825 B2
(45) Date of Patent: Apr. 6, 2004

(54) MULTI-POSITIONABLE AND REVERSIBLE SEAT ASSEMBLY

(75) Inventor: Omar D. Tame, West Bloomfield, MI (US)

(73) Assignee: Magna Seating Systems, Inc., Aurora (CA)

(*) Notice: Subject to any disclaimer, the term of this patent is extended or adjusted under 35 U.S.C. 154(b) by 0 days.

(21) Appl. No.: 10/239,538

(22) PCT Filed: Mar. 22, 2001

(86) PCT No.: PCT/US01/09297
§ 371 (c)(1),
(2), (4) Date: Sep. 23, 2002

(87) PCT Pub. No.: WO01/70537
PCT Pub. Date: Sep. 27, 2001

(65) Prior Publication Data
US 2003/0047974 A1 Mar. 13, 2003

(51) Int. Cl.[7] ................................................. B60N 2/02
(52) U.S. Cl. .................... 297/94; 297/95; 297/101; 297/103
(58) Field of Search ................... 297/94, 95, 101, 297/103, 283.3

(56) References Cited

U.S. PATENT DOCUMENTS

| | | | | |
|---|---|---|---|---|
| 364,011 A | * | 5/1887 | Hale | 297/95 |
| 417,823 A | * | 12/1889 | Hale | 297/95 |
| 491,761 A | * | 2/1893 | Aze et al. | 297/95 |
| 512,539 A | * | 1/1894 | Cushing | 297/95 |
| 566,675 A | * | 8/1896 | Porney | 297/101 |
| 613,423 A | * | 11/1898 | Pickles | 297/103 X |
| 615,227 A | * | 11/1898 | Pickles | 297/101 |
| 675,367 A | * | 5/1901 | Gilfillan | 297/101 |
| 679,081 A | * | 7/1901 | Koehler | 297/95 X |
| 717,208 A | * | 12/1902 | Janson | 297/103 X |
| 725,996 A | * | 4/1903 | Siegel | 297/95 |
| 730,853 A | * | 6/1903 | Kohout | 297/103 X |
| 751,277 A | * | 2/1904 | Frederick | 297/95 |
| 795,501 A | * | 7/1905 | Fassett | 297/101 |
| 805,802 A | * | 11/1905 | Kohout | 297/95 X |
| 808,905 A | * | 1/1906 | Curwen | 297/95 X |
| 809,084 A | * | 1/1906 | Bennett et al. | 297/95 X |
| 814,514 A | * | 3/1906 | Budd | 297/103 X |
| 830,410 A | * | 9/1906 | Budd et al. | 297/103 X |
| 842,298 A | * | 1/1907 | Budd et al. | 297/101 X |
| 848,201 A | * | 3/1907 | Pickles | 297/103 X |
| 935,242 A | * | 9/1909 | Witte | 297/101 |
| 1,140,097 A | * | 5/1915 | Anger | 297/101 X |
| 1,140,342 A | * | 5/1915 | Anger | 297/101 X |

(List continued on next page.)

FOREIGN PATENT DOCUMENTS

| | | | |
|---|---|---|---|
| CH | 287456 | 4/1953 | |
| DE | 43 36 710 C2 | 5/1996 | 297/103 |
| GB | 318676 | 9/1929 | |
| GB | 699609 | 11/1953 | |

Primary Examiner—Peter M. Cuomo
Assistant Examiner—Rodney B. White
(74) Attorney, Agent, or Firm—Clark Hill PLC

(57) ABSTRACT

A multi-positionable and reversible seat assembly (10) for use in an automotive vehicle includes a seat cushion (12) and a seat back operatively connected to the seat cushion. The seat cushion (12) and seat back (14) are supported above the floor of the vehicle by a pair of seat risers. The seat cushion (12) includes a front portion and an opposite rear portion and the seat back (14) includes an upper portion and a lower portion positioned adjacent the seat cushion. The seat assembly (10) is positionable between a plurality of upright and flat bed positions. The seat assembly (10) includes a pair of links for positioning the seat assembly (10) between a forward facing or rearward facing and upright seating position. The links also position the seat in a first or second flat, bed, position with the seat back extending horizontally from either the front portion or the rear portion of the seat cushion (12).

33 Claims, 14 Drawing Sheets

U.S. PATENT DOCUMENTS

| | | | | |
|---|---|---|---|---|
| 1,169,727 A | * | 1/1916 | Lang | 297/101 |
| 1,169,728 A | * | 1/1916 | Lang | 297/101 |
| 1,196,902 A | * | 9/1916 | Thompson | 297/95 X |
| 1,196,908 A | * | 9/1916 | Walker | 297/103 X |
| 1,214,124 A | * | 1/1917 | Bennett | 297/101 |
| 1,231,205 A | * | 6/1917 | Schechter | 297/103 X |
| 1,240,244 A | * | 9/1917 | Ogle | 297/101 |
| 1,252,748 A | * | 1/1918 | Walker | 297/101 |
| 1,298,823 A | * | 4/1919 | Taylor | 297/103 X |
| 1,301,020 A | * | 4/1919 | Walker | 297/101 X |
| 1,360,966 A | * | 11/1920 | Marsh | 297/101 X |
| 1,412,139 A | * | 4/1922 | Schechter | 297/95 X |
| 1,488,659 A | * | 4/1924 | Abel et al. | 297/95 X |
| 1,782,231 A | * | 11/1930 | Cross et al. | 297/95 |
| 1,968,434 A | * | 7/1934 | Bell | 297/103 X |
| 2,726,708 A | * | 12/1955 | Eickhorn et al. | 297/95 |
| 3,265,435 A | * | 8/1966 | Bilancia | 297/101 |
| 3,313,570 A | * | 4/1967 | McVeigh | 297/103 |
| 3,877,746 A | * | 4/1975 | Christine et al. | 297/95 |
| 4,081,051 A | | 3/1978 | Logsdon | 297/94 X |
| 4,322,052 A | * | 3/1982 | Hodge et al. | 297/94 X |
| 4,407,542 A | * | 10/1983 | Kehl et al. | 297/94 X |
| 4,840,427 A | * | 6/1989 | Hong | 297/103 X |
| 5,076,640 A | | 12/1991 | Bulte | 297/94 X |
| 5,322,341 A | * | 6/1994 | Harrison et al. | 297/94 |
| 5,362,124 A | | 11/1994 | Schlidt | 297/95 |
| 6,179,375 B1 | * | 1/2001 | Lane | 297/103 |

* cited by examiner

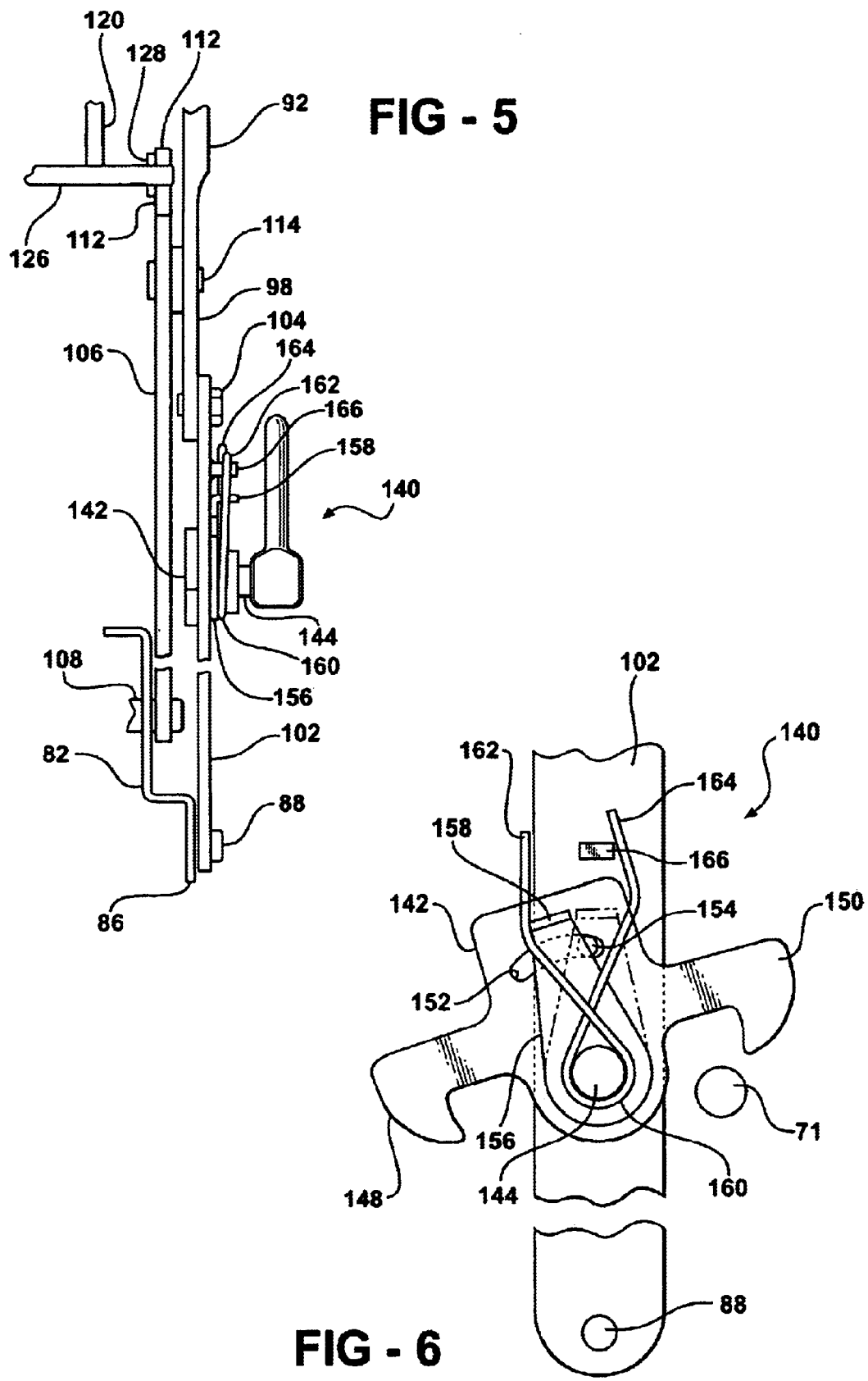

FIG - 18
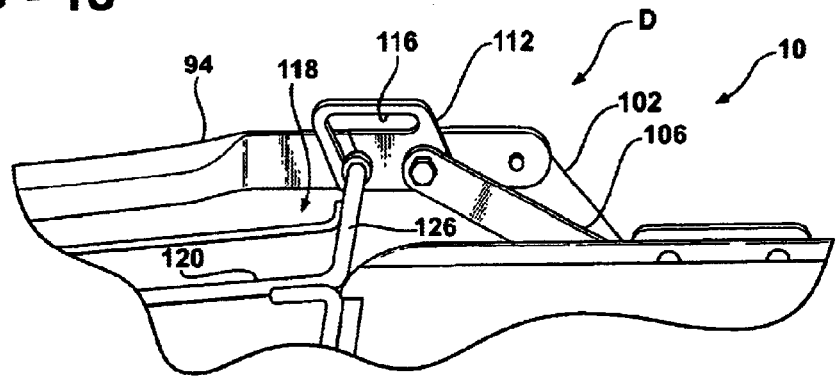
FIG - 19
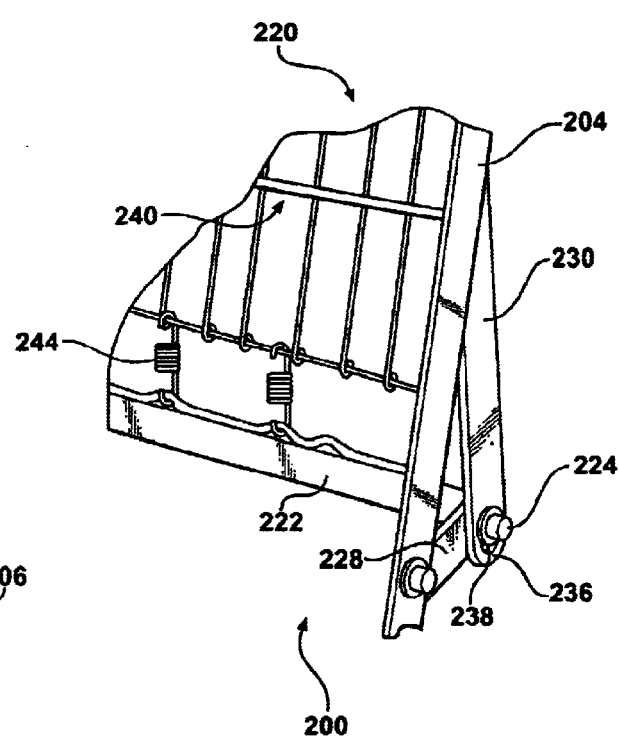
FIG - 22

MULTI-POSITIONABLE AND REVERSIBLE SEAT ASSEMBLY

BACKGROUND OF THE INVENTION

1. Field of the Invention

The present invention relates generally to a seat assembly, and more particularly, to a multi-positionable and reversible seat assembly for an automotive vehicle.

2. Description of the Related Art

Automotive vehicles commonly include front and rear driver side and passenger side seat assemblies for supporting occupants within the vehicle. The seat assemblies may include one or more bucket-type seat assemblies, elongated bench-type seat assemblies, or a combination of each, aligned in one or more rows within the interior compartment of the vehicle. Each seat assembly typically includes a generally horizontal seat cushion and a generally upright seat back coupled to the seat cushion for supporting the seat occupant in an upright seating position. The seat back is commonly pivotally coupled to the seat cushion by a recliner mechanism for providing pivotal movement of the seat back between a plurality of inclined positions relative to the seat cushion. For example, sport utility vehicles and/or mini-vans often include rear seat assemblies wherein the seat back is pivotal about the seat cushion from an upright seating position to a plurality of forwardly and rearwardly inclined positions. That is, the seat back may pivot rearwardly from the upright position to an inclined, or reclined, position and often pivot approximately 90 degrees to a generally flat bed-type position. The seat back may also pivot forwardly from the upright position to a folded, or dumped, position against the seat cushion for providing additional storage space within the vehicle compartment or to allow access behind the seat assembly.

Automotive vehicles, such as full-size vans, also commonly include rear seat assemblies mounted to the floor of the vehicle by a swivel pedestal for allowing the seat assembly to swivel, or rotate, about its vertical axis from a conventional forward facing position to a rearward facing position. For example, the vehicle may include both a second and third row of seat assemblies behind the front driver and passenger seat assemblies wherein the second row of seat assemblies are rotatable from the conventional forward facing position to a rearward facing position facing toward the third row of seat assemblies.

It remains desirable to provide a multi-positionable and reversible seat assembly wherein the seat cushion remains fixedly secured to the floor of the vehicle and the seat back is positionable, or reversible, between upright forward and rearward facing seating positions. It is also desirable to provide a multi-positionable and reversible seat assembly wherein the seat back is also positionable between generally horizontal forward and rearward facing bed positions. It is also desirable to provide a seat assembly that is easily convertible between any of the desired reversible and multi-positions.

SUMMARY OF THE INVENTION

The present invention includes a multi-positionable and reversible seat assembly comprising a pair of spaced apart seat risers adapted for mounting the seat assembly to a vehicle floor. The seat risers include a forward end and an opposite rearward end. The seat assembly further includes a seat cushion operatively coupled between the seat risers and pivotal between a first inclined position against the forward end and a second inclined position against the rearward end of the risers. The seat assembly also includes a seat back operatively coupled to the seat risers and pivotal between a first upright position adjacent the forward end and a second upright position adjacent the rearward end of the risers. The seat assembly includes a linkage mechanism interconnecting the seat risers to each of the seat cushion and the seat back for pivoting the seat cushion between the first inclined position and the second inclined position in response to the seat back pivoting between the first upright position and the second upright position.

BRIEF DESCRIPTION OF THE DRAWINGS

Other advantages of the present invention will be readily appreciated as the same becomes better understood by reference to the following detailed description when considered in connection with the accompanying drawings wherein:

FIG. 5 is a partially broken front view of a linkage mechanism between the seat back and seat cushion of the seat assembly;

FIG. 6 is a partially broken front view of a latch mechanism for locking the seat assembly in each of the upright seating positions;

FIG. 18 is a partially broken perspective view of an inner suspension support structure of the seat back;

FIG. 19 is a side view of the inner suspension support structure of the seat back;

FIG. 22 is a partially broken perspective view of the inner suspension support of FIG. 21.

DETAILED DESCRIPTION OF THE PREFERRED EMBODIMENT

Figure 1:
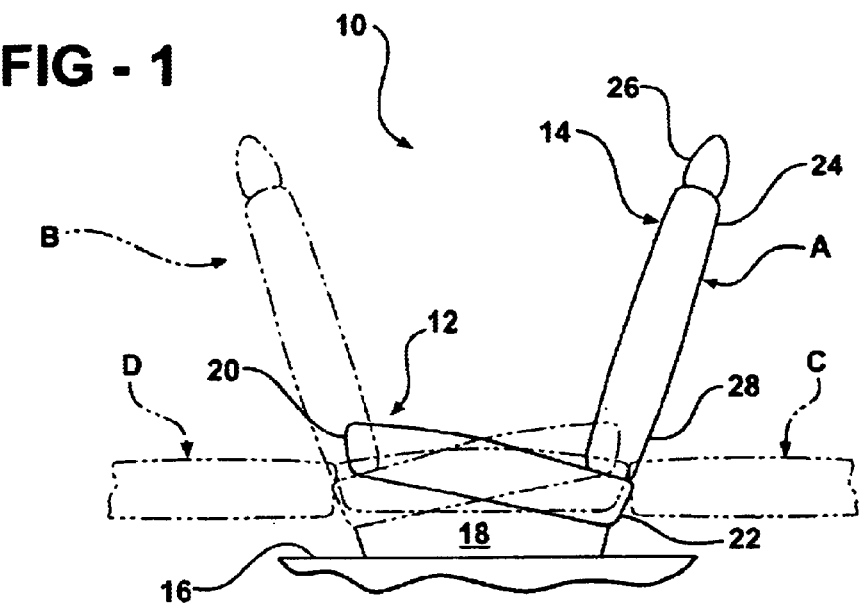
FIG. 1 is a side view of a seat assembly shown in a variety of positions.

Referring to FIG. 1, a multi-positionable and reversible seat assembly according to the subject invention is generally shown at 10 for use in an automotive vehicle. The seat assembly 10 includes a seat cushion 12 and a seat back 14 operatively coupled to the seat cushion 12. The seat cushion 12 is supported above the floor of the vehicle, depicted at 16, by a riser 18. The seat assembly 10 may include a bucket-type seat, a bench-type seat, or a split-type seat, such as a 60/40 seat, as is commonly known to one skilled in the art, without varying from the scope of the invention. The seat cushion 12 includes a front portion 20 and an opposite rear portion 22. The seat back 14 includes an upper portion 24 for supporting a head restraint 26 and an opposite lower portion 28 positioned adjacent seat cushion 12.

FIG. 1 discloses the seat assembly 10 in a plurality of seat positions. First, the seat assembly 10 is shown in a forward facing and upright seating position at A. "Forward facing" is defined as the seat cushion 12 and seat back 14 positioned to support a seat occupant in a direction facing toward the front of the vehicle, as is commonly known. With the seat assembly 10 in the forward facing and upright seating position A, the seat cushion 12 is inclined such that the front portion 20 is spaced further from the vehicle floor 16 than the rear portion 22. Additionally, the seat back 14 is in a generally upright position with the lower portion 28 immediately adjacent the rear portion 22 of the seat cushion 12. Second, the seat assembly 10 is also shown in a rearward facing and upright seating position at B. Conversely, "rearward facing" is defined as the seat cushion 12 and seat back 14 positioned to support a seat occupant in a direction facing toward the rear of the vehicle. With the seat assembly 10 in the rearward facing and upright seating position B, the seat cushion 12 is inclined such that the rear portion 22 is spaced further from the vehicle floor 16 than the front portion 20. Additionally, the seat back 14 is still in a generally upright position, however, the lower portion 28 is now immediately adjacent the front portion 20 of the seat cushion 12. Third, the seat assembly 10 is further shown in a first flat bed position at C. In the first flat bed position C, the seat cushion 12 is positioned generally planar and parallel to the vehicle floor 16. The seat back 14 is reclined from the forward facing and upright seating position to a generally horizontal position extending rearwardly from the rear portion 22 of the seat cushion 12 and generally planar and parallel to both the seat cushion 12 and the vehicle floor 16. Finally, the seat assembly 10 is additionally shown in a second flat bed position at D. In the second flat bed position D, the seat cushion 12 is again positioned generally planar and parallel to the vehicle floor 16. However, the seat back 14 is reclined from the rearward facing and upright seating position to a generally horizontal position extending forwardly from the front portion 20 of the seat cushion 12 and generally planar and parallel to both the seat cushion 12 and the vehicle floor 16.

Figure 2:
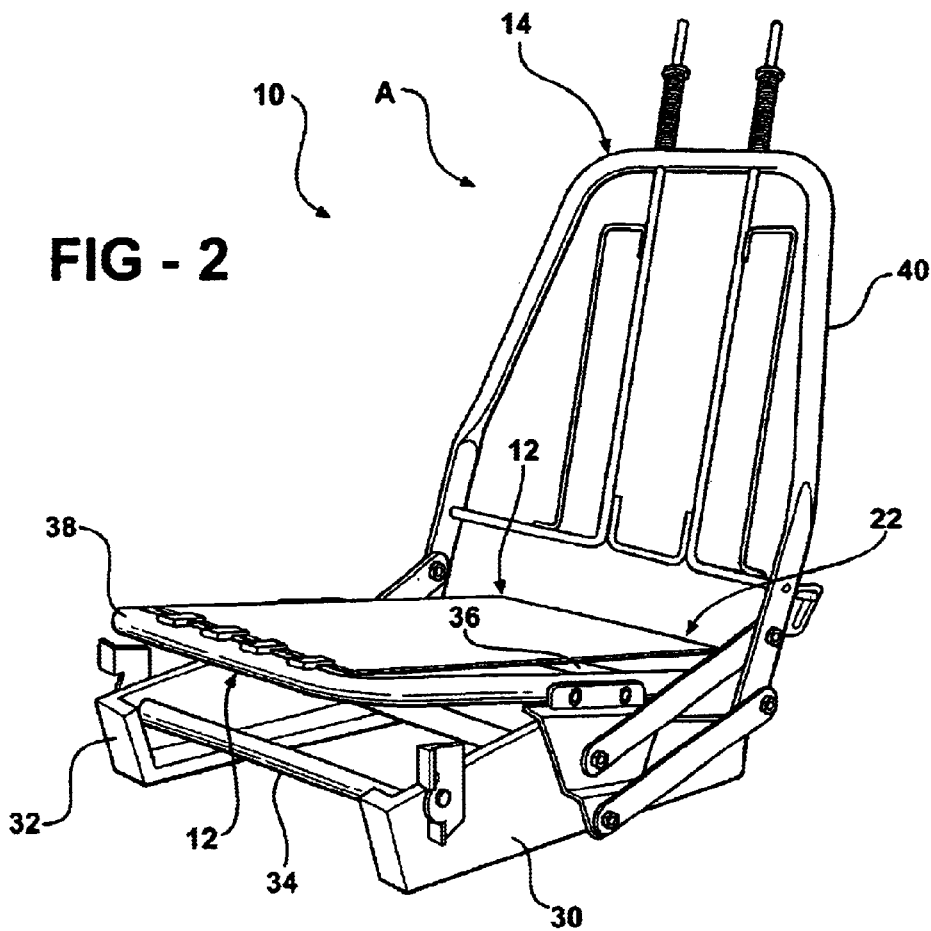
FIG. 2 is a perspective view of the seat assembly in a forward facing and upright seating position.

The seat assembly 10 is therefore, multi-positionable, or reversible, from any one of the positions A–D to any other one of the positions A–D, as will be described in further detail hereinbelow. That is, the seat assembly 10 maybe positioned from the forward facing and upright seating position A directly to the rearward facing and upright position B, the first bed position C or the second bed position D. The same is applicable from any of the other positions A–D. It should be appreciated that the seat assembly 10 may also be secured to the vehicle floor 16 in a position other than forward facing and rearward facing. That is, the seat assembly 10 may be positioned in the vehicle transverse or angled with respect to the front and rear of the vehicle to allow side-to-side reversible positioning of the seat assembly 10 in each of the positions A–D. Referring to FIG. 2, the seat assembly 10 is shown in the forward facing and upright position A. The seat assembly 10 includes an inboard riser 30 and an outboard riser 32 for fixedly securing and supporting the seat assembly 10 to the vehicle floor 16. The inboard riser 30 is typically adjacent the driver side of the vehicle and the outboard riser 32 is typically adjacent or toward the passenger side of the vehicle. The inboard 30 and outboard 32 risers are parallel, spaced apart and interconnected by cross support bars 34, 36 adjacent the respective front portion 20 and rear portion 22 of the seat cushion 12. The seat cushion 12 includes a tubular and generally rectangular seat cushion support frame 38. The seat back 14 similarly includes a tubular and generally U-shaped seat back support frame 40. The seat cushion support frame 38 and the seat back support frame 40 are each operatively connected to the risers 30, 32 as will be further described below.

Figure 3:
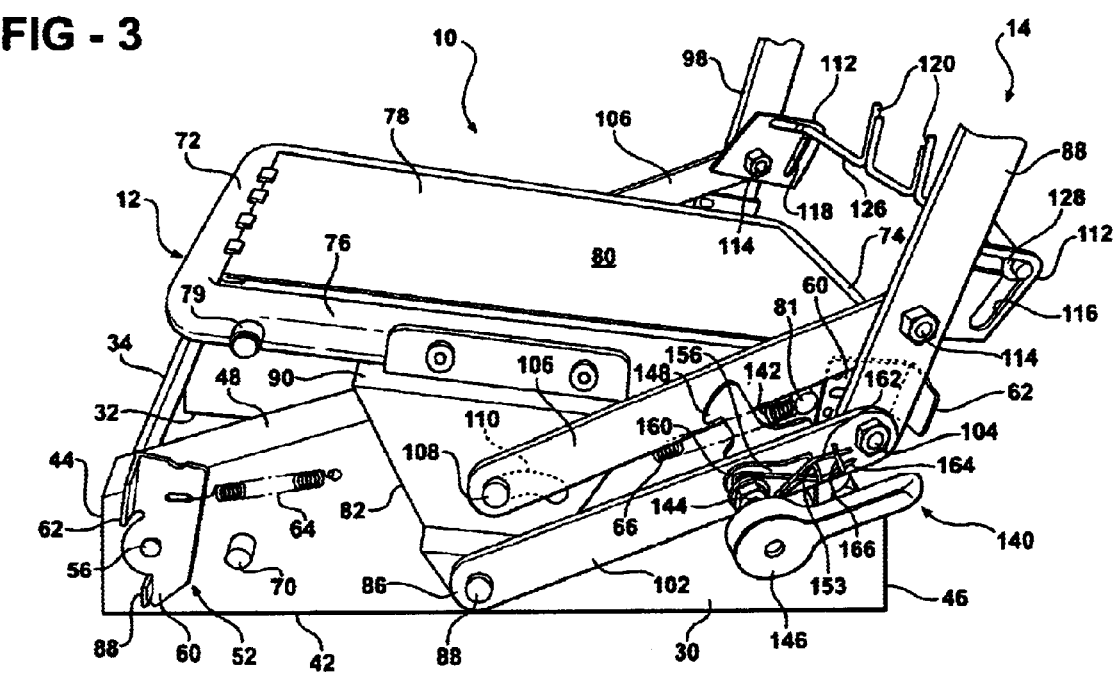
FIG. 3 is partially broken perspective view of the seat assembly of FIG. 2.
Figure 4:
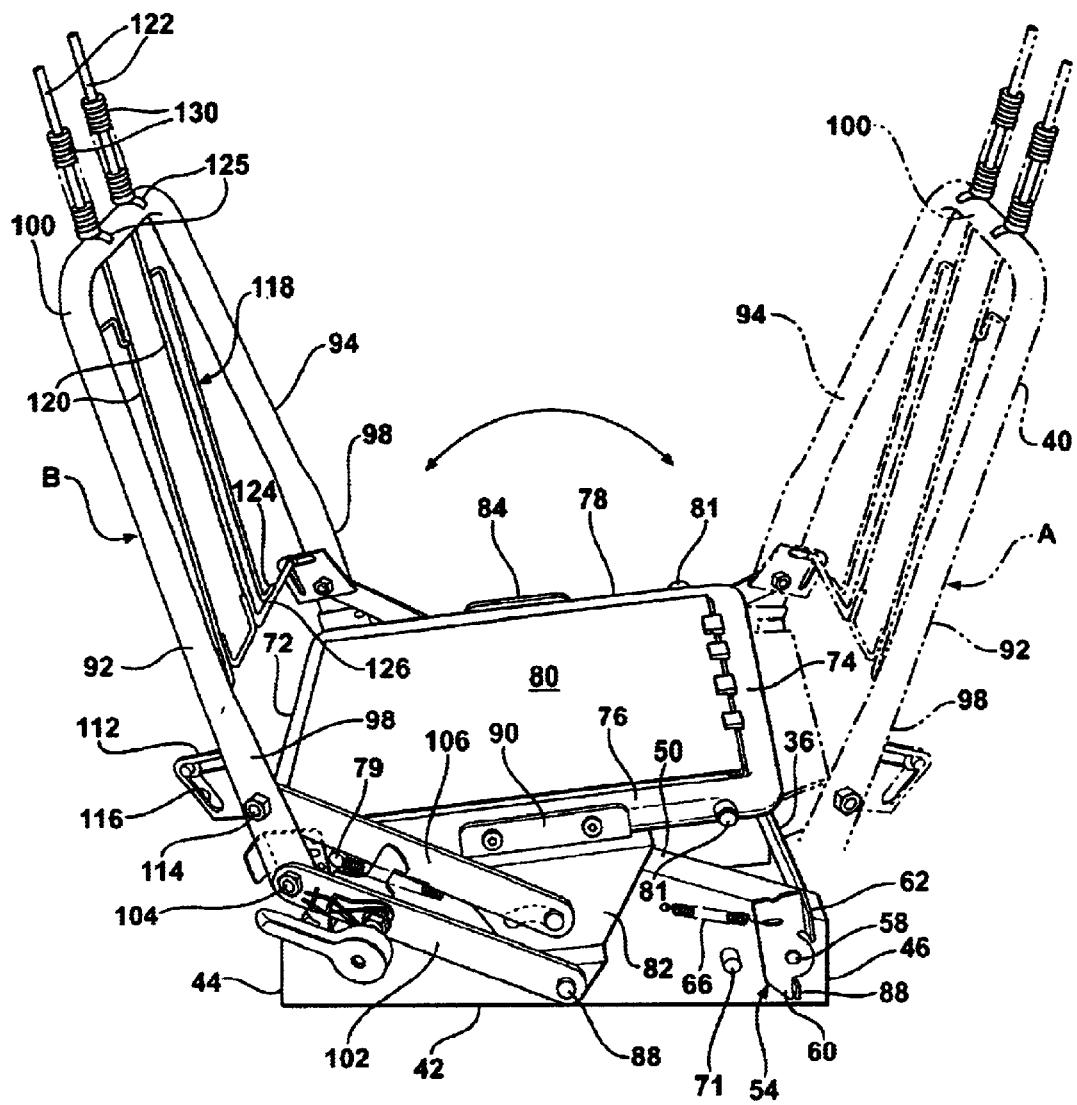
FIG. 4 is a perspective view of the seat assembly in a rearward facing and upright seating position.

Referring to FIGS. 3 and 4, the inboard 30 and outboard 32 risers each include a bottom surface 42 extending between a forward end 44 and a rearward end 46. The bottom surface 42 of each riser 30, 32 is adapted to be fixedly mounted to the floor 16 of the vehicle such as by bolts. Each riser 30, 32 also includes opposing upper inclined surfaces 48, 50 extending from the respective ends 44, 46 to a center peak therebetween. A pair of seat cushion supports 52, 54 are mounted to each of the risers 30, 32 between the ends 44, 46. More specifically, a seat cushion support 52 is pivotally secured by pivot pin 56 to each riser 30, 32 adjacent the forward end 44 and between the bottom surface 42 and the inclined surface 48. Similarly, a seat cushion support 54 is pivotally secured by pivot pin 58 to each riser 30, 32 adjacent the rearward end 46 and between the bottom surface 42 and the inclined surface 50. The seat cushion supports 52, 54 are generally L-shaped shaped having a main plate 60 pivotally secured to the riser 30, 32 and a push plate 62 extending outwardly from the main plate 60. A return spring 64 is connected between the main plate 60 of the seat cushion support 52 and the riser 30, 32 for biasing the seat cushion support 52 in the clockwise direction. Similarly, a return spring 66 is connected between the main plate 60 of the seat cushion support 54 and the riser 30, 32 for biasing the seat cushion support 54 in the counterclockwise direction. A nub 68 protrudes outwardly from the outer surface of the risers 30, 32 below and adjacent each seat cushion support 52, 54 for abutting with the lower portion of the main plate 60 and limiting the rotation in the respective clockwise and counterclockwise directions about the pivot pins 56, 58. Each riser 30, 32 further includes a pair of cylindrical locking pins 70, 71 projecting outwardly from the outer surface of each riser 30. The locking pin 70 is mounted adjacent the seat cushion support 52, below the return spring 64. Similarly, the locking pin 71 is mounted adjacent the seat cushion support 54, below the return spring 66. The purpose of the locking pins 70, 71 will be discussed hereinbelow.

Still referring to FIGS. 3 and 4, the seat cushion support frame 38 includes a front tube 72 adjacent the cross support bar 34 and a rear tube 74 adjacent the cross support bar 36. A pair of spaced apart inboard and outboard tubes 76, 78, interconnect the front tube 72 and rear tube 74. The seat cushion 12 further includes a suspension mat 80 fixedly secured and supported between the front tube 72 and rear tube 74 of the seat cushion support frame 38. The suspension mat 80 is a planar mat of interwoven, resilient material providing flexibility and resilient support to the occupant supported on the seat cushion 12. The seat cushion support frame 38 also includes a pair of cylindrical support posts 79, 81 projecting outwardly from each of the inboard 76 and outboard 78 tubes. The support posts 79 on the inboard 76 and outboard 78 tubes are positioned adjacent the front tube 72. The support posts 81 on the inboard 76 and outboard 78 tubes are position adjacent the rear tube 74.

The seat cushion 12 further includes a first and second triangular shaped hinge plates 82, 84 for securing the seat cushion support frame 38 to the inboard and outboard risers 30, 32. The first hinge plate 82 is fixedly secured to the inboard tube 76 and the second hinge plate 84 is fixedly secured to the outboard tube 78 by bolts, welds, or the like. Each hinge plate 82, 84 includes a lower apex 86 for receiving a main pivot rod 88 therethrough and pivotally mounting the hinge plates 82, 84 to the respective risers 30, 32. More specifically, the pivot rod 88 extends between and through the spaced apart risers 30, 32 to support the hinge plates 82, 84 and provide pivotal movement of the hinge plates 82, 84, and therefore the seat cushion support frame 38 about the risers 30, 32. Each of the hinge plates 82, 84 further include an upper support shelf 90 positioned immediately above the inclined surfaces 48, 50 of the risers 30, 32. The upper support shelf 90 positions and supports the seat cushion support frame 38 on one of the inclined surfaces 48 or 50 of the risers 30, 32, or therebetween, depending on the position of the seat assembly 10, as will be further discussed.

Referring to FIG. 4, the seat back support frame 40 of the seat back support frame 40 further includes an inboard tube 92 and an outboard tube 94 operatively connected to the seat cushion 12. Each of the inboard 92 and outboard 94 tubes include an upper end 96 and a lower distal end 98. The upper ends 96 are interconnected by an upper cross tube 100 and the lower distal ends 98 are operatively connected to the seat cushion 12. The seat back support frame 40 is operatively connected to the seat cushion 12 by a four bar linkage mechanism 101. For simplicity, the inboard side of the seat assembly 10 shown in FIG. 3 and FIG. 4 will be described. It should be understood and appreciated that the outboard side of the seat assembly is substantially identical to the inboard side unless otherwise indicated. Specifically, referring to FIG. 3, an elongated lower link 102 extends between each of the lower distal ends 98 of the respective inboard 92 and outboard 94 tubes to the lower apex 86 of the respective hinge plate 82, 84. The lower link 102 includes a first end pivotally coupled by a pivot pin 104 to the lower distal end 98 of the respective inboard 92 and outboard 94 tubes. The lower link 102 also includes an opposite second end pivotally coupled by the pivot rod 88 to the lower apex 86 of the hinge plates 84, 86. The lower link 102 provides pivotal movement of the seat back support frame 40 about the pivot rod 88 from the forward facing and upright position A to the rearward facing and upright position B as shown in FIG. 4.

An elongated upper link 106 also extends between each of the lower distal ends 98 of the respective inboard 92 and outboard 94 tubes to the respective hinge plates 82, 84. The upper link 106 includes a first end pivotally coupled to the respective hinge plates 84, 86 between the lower apex 86 and the upper support shelf 90. The first ends of the upper links 106 are pivotally coupled to the hinge plates 84, 86 by an elongated, cylindrical pivot rod 108, which extends between the hinge plates 84, 86 and risers 30, 32. More specifically, one end of the pivot rod 108 extends through a bore in the hinge plate 84 and through an arcuate-shaped slot 110 in the inboard riser 30. The opposite end of the pivot rod 108 similarly extends through an arcuate-shaped slot in the outboard riser 32 and through a bore in the hinge plate 86. The first ends of each of the upper links 106 are secured to the respective ends of the pivot rod 108 adjacent the hinge plates 84, 86. The upper link 106 further includes a second distal end forming a bulbous, or diamond, shaped portion 112. The lower distal ends 98 of the inboard 92 and outboard 94 tubes are pivotally connected to the upper link 106 by a pivot pin 114 adjacent the bulbous portion 112. That is, the pivot pin 114 pivotally connects the lower distal end 98 to the upper link 106 between the bulbous portion 112 and the first end, or pivot rod 108. Therefore, as shown in FIG. 4, the bulbous portion 112 of the upper link 106 extends beyond the inboard 92 and outboard 94 tubes when the seat back 14 is in the forward facing and upright position A and the rearward facing and upright position B. Additionally, the lower distal ends 98 of the inboard 92 and outboard 94 tubes are at least partially positioned, or sandwiched, between the lower link 102 and the upper link 106 with the pivot pin 104 of the lower link 102 spaced below the pivot pin 114 of the upper link 106. The bulbous portion 112 of the upper link 106 includes a V-shaped slot 116 therethrough. The V-shaped slot 116 is arranged in the bulbous portion 112 with the point of the V-shape adjacent the second distal end of the upper link 106 and opening, or extending, with the V-shape facing toward the first end of the upper link 106. FIG. 5 is a front view of the lower end 98 of the inboard tube 92 positioned between the lower link 102 and the upper link 106. FIG. 5 also depicts the pivotal connections between the upper 106 and lower 102 links and the hinge plate 82 as well as the pivotal connections between the inboard tube 92 and the links 102, 106.

Referring to FIGS. 3 and 4, the seat back 14 further includes an inner suspension support frame 118 operatively connected between the seat back support frame 40 and the upper link 106. The inner suspension support frame 118 includes a pair of spaced apart, elongated and cylindrical support bars 120 extending parallel with the inboard 92 and outboard 94 tubes between first ends 122 and second ends 124. The first ends 122 extend through bores in the upper cross tube 100 and project above the upper cross tube 100 to receive and mount the head restraint 26 to the seat back 14 in a conventional manner. The bores in the upper cross tube 100 are further defined by elongated slots 125 for slidably receiving the ends 122 of the support bars 120 to allow the ends 122 to pivot forward or rearward with respect to the upper cross tube 100 as will be further described below. The second ends 124 are connected to an elongated, cylindrical cross bar 126 which is generally perpendicular to the support bars 120 and extends between the inboard 92 and outboard 94 tubes. The cross bar 126 includes opposite distal ends that are received and guided within the V-shaped slots 116 in the bulbous portion 112 of the respective upper links 106. A locking ring 128 is secured to the distal ends of the cross bar 126 to retain the ends in the V-shaped slots 116. The inner suspension support frame 118 further includes a pair of coil springs 130 seated around the respective support bars 120 and secured between the first ends 122 and the upper cross tube 100. The coil springs 130 are secured in compression to bias the inner suspension support frame 118 toward the upper cross tube 100 and the bias the opposing distal ends of the cross bar 126 toward the point of the V-shaped slot 116.

Referring to FIGS. 3 and 6, the seat assembly 10 further includes a latch mechanism 140 for releasably locking the seat assembly 10 in each of the positions A–D as shown in FIG. 1. The latch mechanism 140 includes a latch plate 142 pivotally connected to the lower link 102 by a pivot shaft 144. The pivot shaft 144 extends through an aperture in the lower link 102 from a first end to a second end. The latch plate 142 is fixedly secured to the first end of the pivot shaft 144 and seated between the lower link 102 and the upper link 106, below the lower distal end 98 of the inboard tube 92 as shown in FIG. 5. A latch handle 146 is fixedly secured to the second end of the pivot shaft 144 and extends outwardly and is spaced from the lower link 104 for rotating the shaft 144 and latch plate 142 in both the clockwise and counterclockwise directions. The latch plate 142 includes a forward hook 148 and a rearward hook 150 opposite the forward hook 148. That is, the forward hook 148 extends forward of the lower link 102 and the rearward hook 150 extends rearward of the lower link 102.

Referring to FIG. 6, the latch plate 142 further includes an arcuate slot 152 passing through the plate 142 and extending between the forward hook 148 and the rearward hook 150. A guide pin 154 projects outwardly from the lower link 102 and is received within the slot 152 for limiting the rotational movement of the latch plate 142 in the clockwise and counterclockwise directions. A centering plate 156 is also fixedly secured to the pivot shaft 144 between the latch handle 146 and the lower link 102 for rotation therewith in each direction. The centering plate 156 includes a tab 158 projecting therefrom in the direction of the latch handle 146. A generally figure-eight shaped self centering spring 160 is coupled around the pivot shaft 144 for centering the latch plate 142. More specifically, the spring 160 is looped around the pivot shaft 144 and includes a first free end 162 biased against the tab 158 and a second free end 164 biased against a tab 166 projecting from the lower link 102. The self-centering spring 160 biases the latch plate 142 in a center position wherein the guide pin 154 is midway between the ends of the arcuate slot 152 and the hooks 148, 150 are extending an equal distance from the opposing sides of the lower link 102. The forward hook 148 is lockingly engagable with the locking pin 70 when the seat assembly 10 is in the rearward facing and upright seating position B and the second bed position D. Similarly, the rearward hook 150 is lockingly engagable with the locking pin 71 when the seat assembly is in the forward facing and upright seating position A and the first bed position C.

Figure 7:
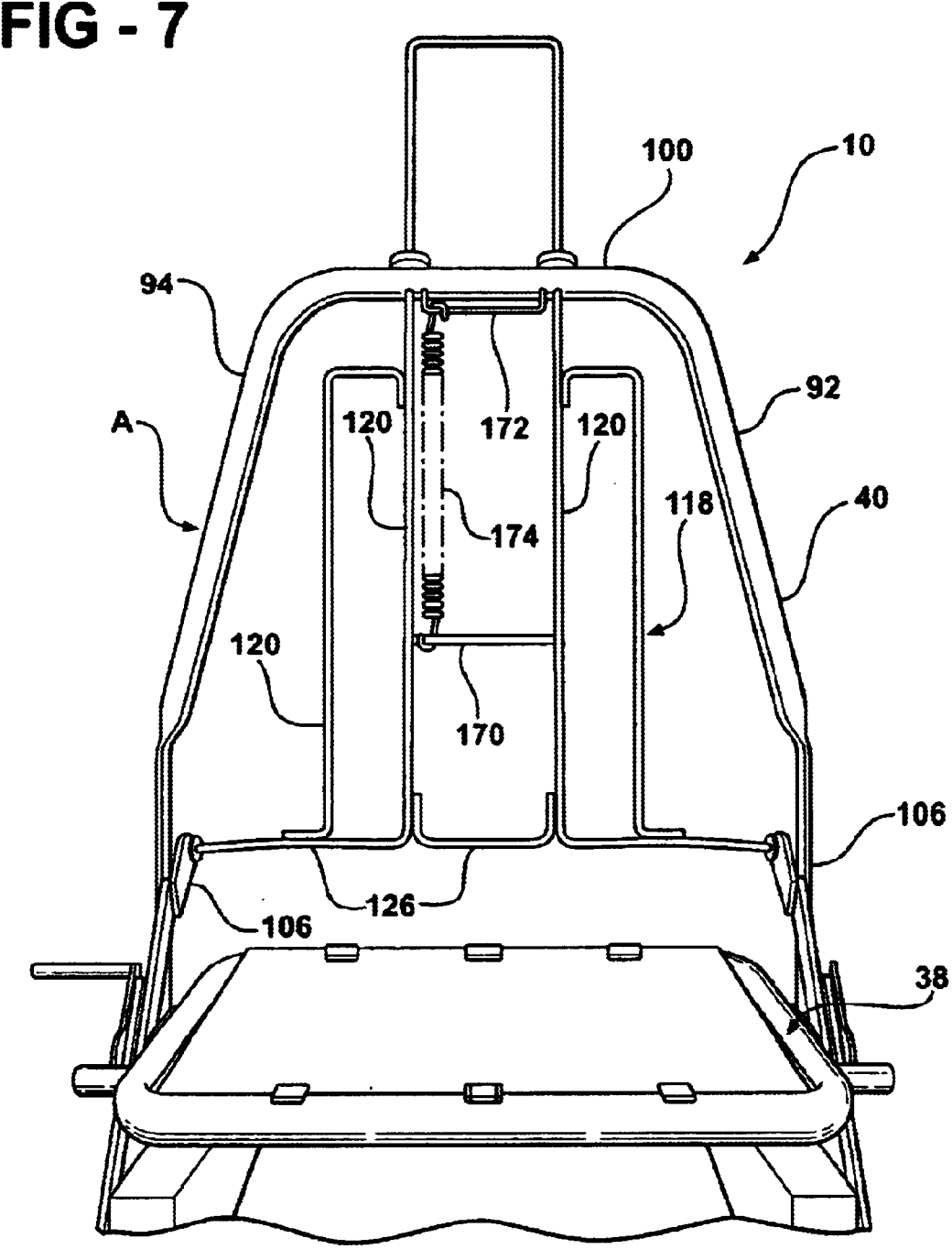
FIG. 7 is a front view of the seat assembly.

Referring to FIGS. 7–15, an alternative embodiment of the seat assembly 10 is shown. FIG. 7 discloses an alternative arrangement of the inner suspension support frame 118 wherein the support bars 120 extend from the cross bar 126 to the first end extending through the upper cross tube 100. A first brace 170 interconnects the support bars 120 between the cross bar 126 and the upper cross tube 100. A second bracket 172 extends downwardly from the upper cross tube 100. A tension spring 174 is connected to and extends between the first brace 170 and the second brace 172 to bias the cross bar 126 toward the cross tube 100. That is, the tension spring 174 is an alternative to the coil springs 130 of FIG. 4 which acts in tension on the inner suspension support frame 118 as opposed to acting in compression. FIGS. 8–15 discloses an alternative configuration of the seat cushion supports 52, 54. Specifically, the seat cushion supports 52, 54 are pivotally connected to the risers 30, 32 by pivot pins 56, 58, respectively. The seat cushion supports 52, 54 include a J-shaped main plate 60 having an outwardly projecting push plate 62 aligned for engagement by the lower link 102. The push plate 62 of FIGS. 3 and 4 is conversely aligned for engagement with the inboard 92 and outboard 94 tubes. Additionally, a coil spring 180 is secured between the pivot pin 56, 58 and the main plate 60 for biasing the seat cushion support 52 in the counterclockwise direction and the seat cushion support 54 in the clockwise direction. The main plate 60 still abuts with a nub 68 on the riser 30, 32 to limit the rotational movement of the seat cushion supports 52, 54.

Figure 8:
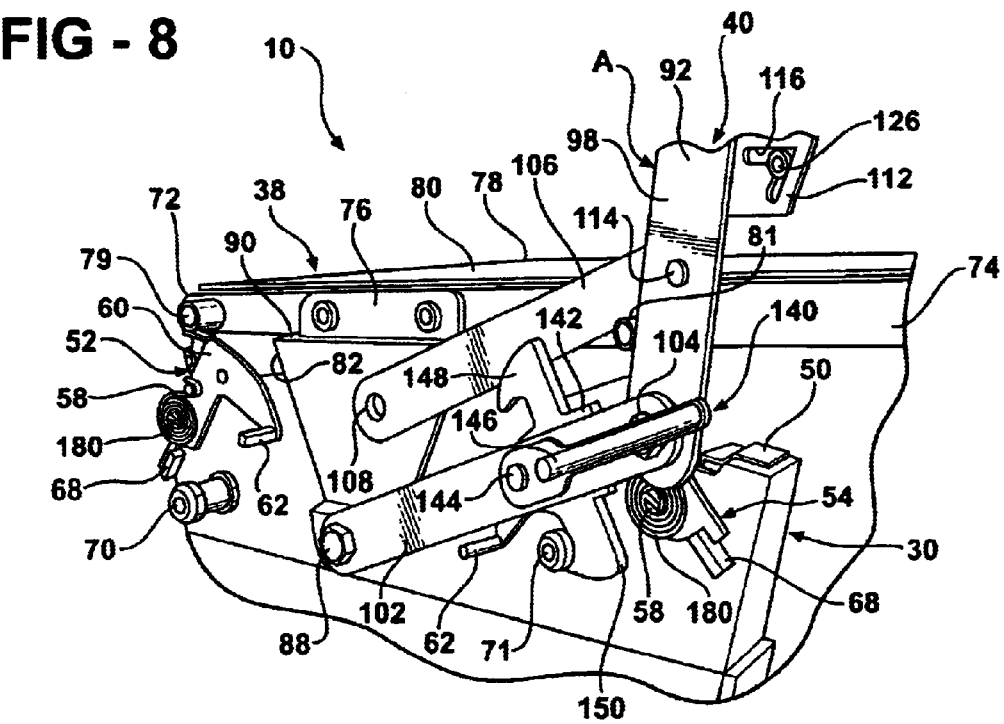
FIG. 8 is a partially broken perspective view of the linkage mechanism and latch mechanism with the seat assembly in an upright seating position.

In operation, and referring to FIGS. 3 and 4 and to FIGS. 7–15, the seat assembly 10 is multi-positionable and reversible between any of the positions A–D. First, the seat assembly 10 is shown in the forward facing and upright seating position A in FIGS. 7 and 8. In position A, the seat back support frame 40 is positioned adjacent the rear tube 74. The lower links 102 extend from the pivot rod 88 on the respective hinge plates 82, 84 to the pivot pins 104 on the lower distal ends 98 of the inboard 92 and outboard 94 tubes of the seat back support frame 40. The lower links 102 position the seat back support frame 40 such that the lower distal ends 98 are positioned adjacent the rear tube 74 of the seat cushion support frame 38 and extend upwardly therefrom to the upper cross tube 100. The upper links 106 extend from the opposing ends of the pivot rod 108 to the pivot pins 114 on the lower distal ends 98 of the inboard 92 and outboard 94 tubes of the seat back support frame 40. The bulbous portion 112 of the upper links 106 extends rearward of, or behind, the inboard 92 and outboard 94 tubes and supports the cross bar 126 of the inner suspension support frame 118 in the apex, or point, of the V-shaped slot 116. As shown in FIG. 8, the upper link 106 is positioned above and parallel to the lower link 102 and extends between the hinge plates 82, 84 and the respective inboard 92 and outboard 94 tubes of the seat back support frame 40.

Additionally, the lower link 102 is engaged with the push plate 62 of the seat cushion supports 52, 54. The seat cushion supports 52, 54 are rotated in the clockwise direction about the respective pivot pins 58, away from the support posts 81, by engagement with the lower links 102 to prevent interference with the support posts on the seat cushion support frame 38. Alternatively, as shown in FIG. 3, the lower distal ends 98 of the inboard 92 and outboard 94 tubes may engage the push plate 62 of the seat cushion supports 52, 54 to rotated the supports 52, 54 about the pivot pins 58 and away from the support posts 81.

The upper links 106 engage the support posts 81 projecting from the inboard 76 and outboard 78 tubes of the seat cushion support frame 38 to pivot the seat cushion support frame 38 about the pivot rod 88 toward the inclined surface 50 of the inboard 30 and outboard 32 risers. The upper support shelf 90 of each hinge plate 82, 84 is therefore supported on the inclined surfaces 50 of the inboard 30 and outboard 32 risers. Finally, the rearward hook 150 of the latch mechanism 140 is lockingly engaged with the locking pin 71 on the inboard riser 30 to retain both the seat cushion support frame 38 and the seat back support frame 40 of the seat assembly 10 in the forward facing and upright seating position A.

Figure 9:
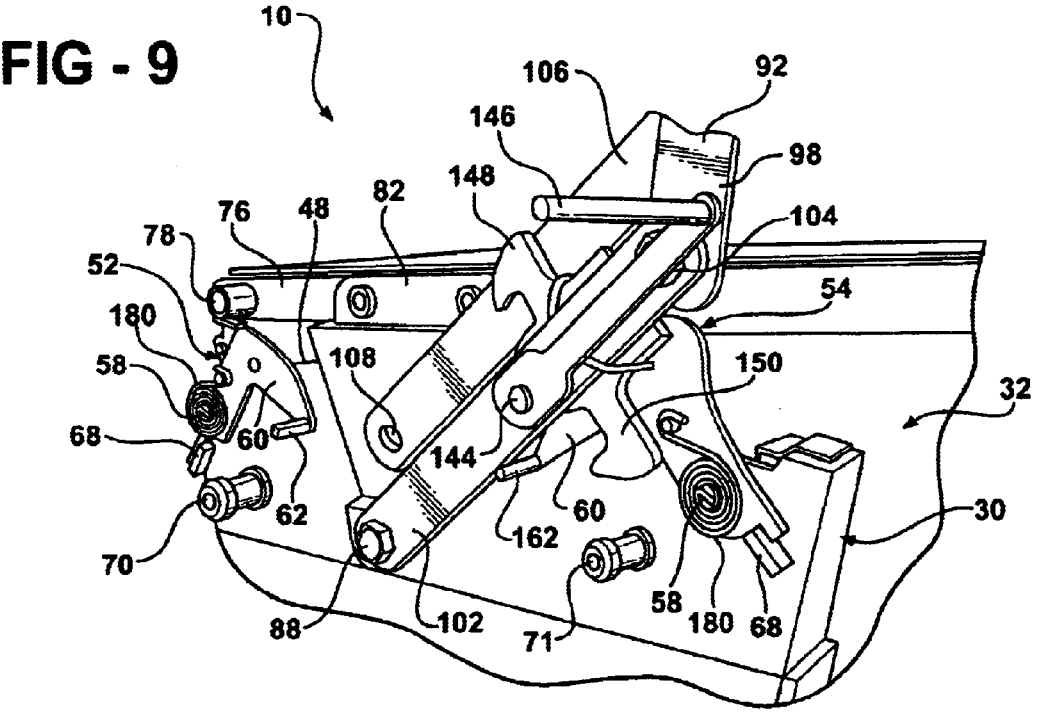
FIG. 9 is a partially broken perspective view of the linkage mechanism and latch mechanism with the seat assembly released from the upright seating position.
Figure 10:
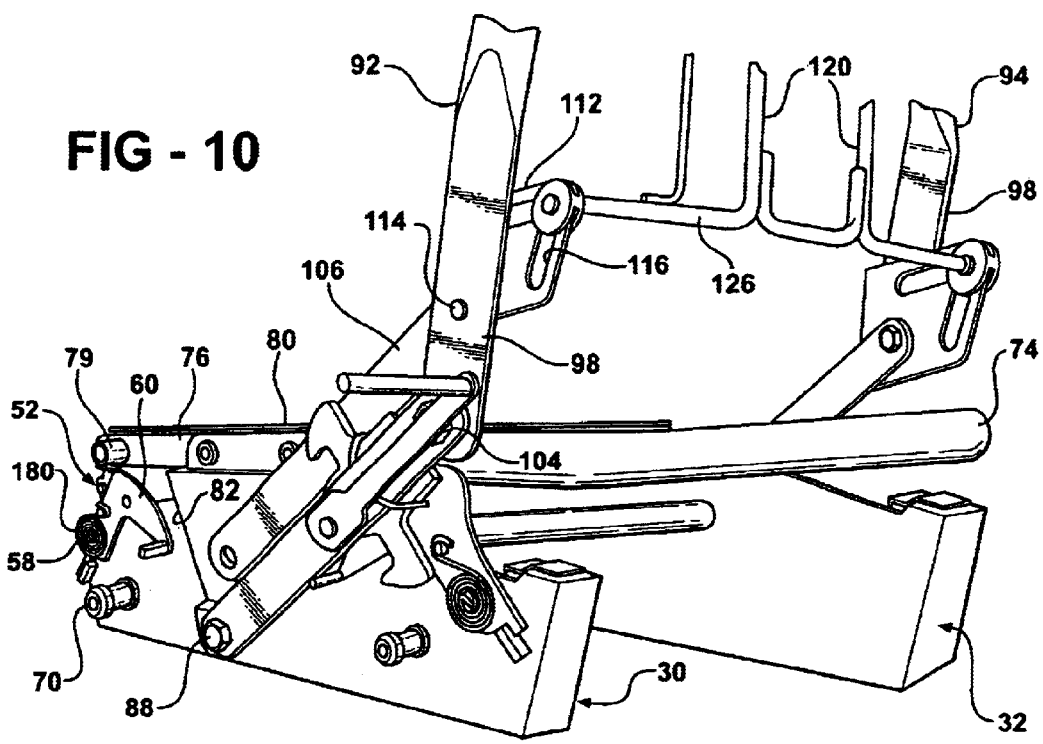
FIG. 10 is another partially broken perspective view of the linkage mechanism and latch mechanism with the seat assembly released from the upright seating position.
Figure 11:
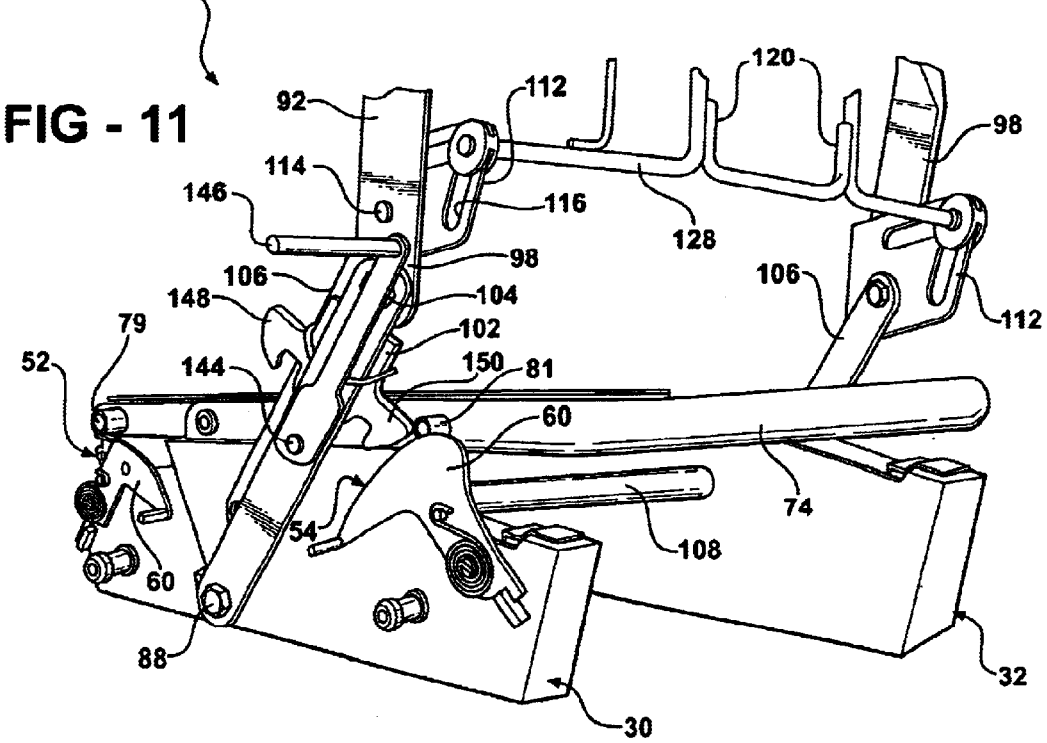
FIG. 11 is still another partially broken perspective view of the linkage mechanism and latch mechanism with the seat assembly released from the upright seating position.

The seat assembly 10 is unlocked, or released, from position A by the latch mechanism 140. When the latch handle 146 is pivoted in the counterclockwise direction, the pivot shaft 144 is rotated about the lower link 102 to pivot the latch plate 142 and release the rearward hook 150 from the locking pin 71. The seat back support frame 40 is then free to pivot about the seat cushion support frame 38 via the upper 106 and lower 102 links. Specifically, if the latch handle 146 is pushed toward the forward end 44 of the risers 30, 32, the lower links 102 will be forced to pivot about the pivot rod 88. Since the upper link 106 is pivotally connected to the inboard 92 and outboard 94 tubes, the upper link 106 is also forced to pivot about the pivot rod 108. The links 102, 106, therefore pivot the seat back support frame 40 away from the rearward end 46 of the risers 30,32 as shown in FIGS. 9, 10 and 11.

Figure 12:
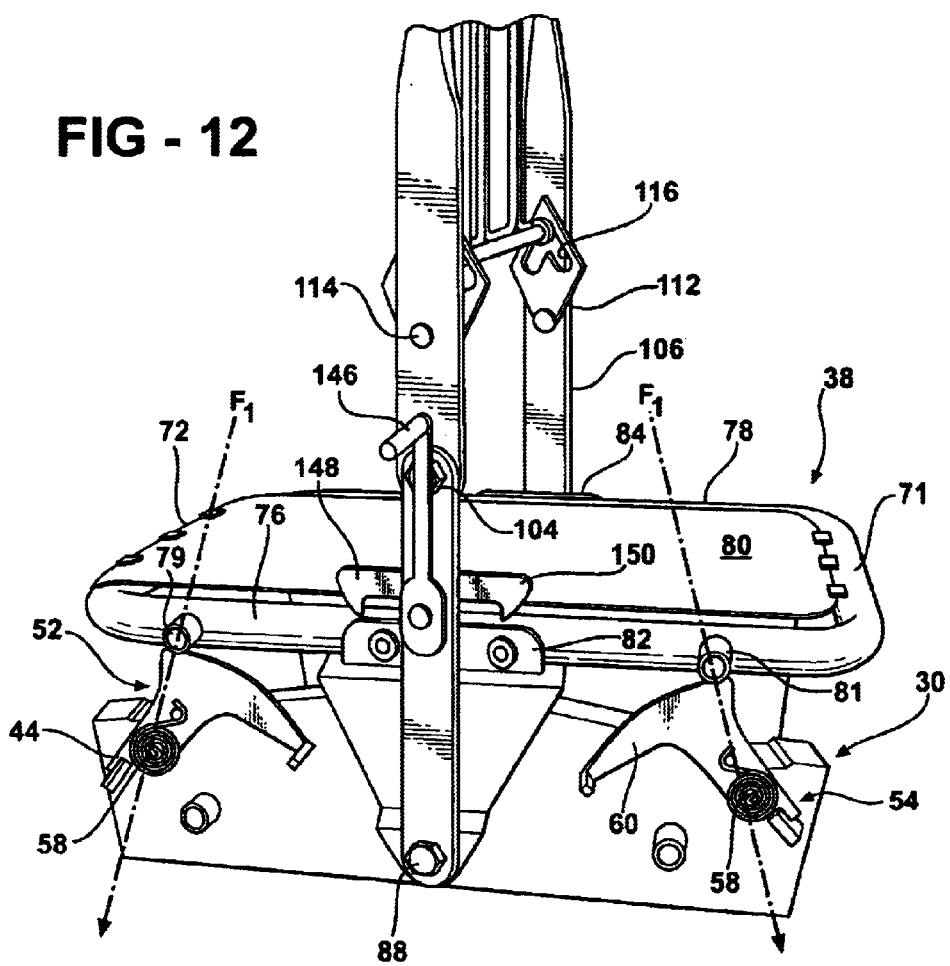
FIG. 12 is a partially broken perspective view of the seat assembly with the seat back midway between the forward facing and rearward facing upright seating positions.

The coil springs 130, or alternatively the tension spring 174, of the seat back suspension frame 118 biases the support bars 120 and the cross bar 124 upwardly toward the upper cross tube 100. The cross bar 124, having its ends secured within the V-shaped slot of the bulbous portion 112, pulls upwardly on the end of the upper link 106. Since the end, or bulbous portion 112, of the upper link 106 extends behind the inboard and outboard tubes 92, 94, the springs 130 or 174 assist in pivoting the seat back support frame 40 about the hinge plates 82, 84. That is, with the upper link 106 extending behind the inboard and outboard tubes 92, 94, an angle is created between the tubes 92, 94 and the support bars 120. Since the upper link 106 is free to pivot about pivot pins 114 and 108, the springs 130 or 174 urge the seat back support frame 40 toward an upright position wherein the inboard and outboard tubes 92, 94 are aligned vertically with the upper and lower links 106, 102 as shown in FIG. 12. In other words, the springs 130 or 174 assist in centering the seat back 14 between the front portion 20 and rear portion 22 of the seat cushion 12. The seat cushion frame 38 is also pivoted by the hinge plates 84, 86 about the pivot rod 88 from an inclined position supported against the inclined surface 50 to a generally horizontal position, as shown. Still referring to FIG. 12, the seat cushion supports 52, 54 are biased against the nubs 68 and engaged by the respective support posts 79, 81 to support the seat cushion support frame 38 in the horizontal position. Since the seat cushion support frame 38 pivots about the rod 88, the seat cushion supports 52, 54 are aligned such that the line of force, shown in FIG. 12 as F1, projects from the support posts 79, 81 through the pivot pins 56, 58, respectively, to prevent the seat cushion support frame 38 from pivoting in either direction.

Figure 13:
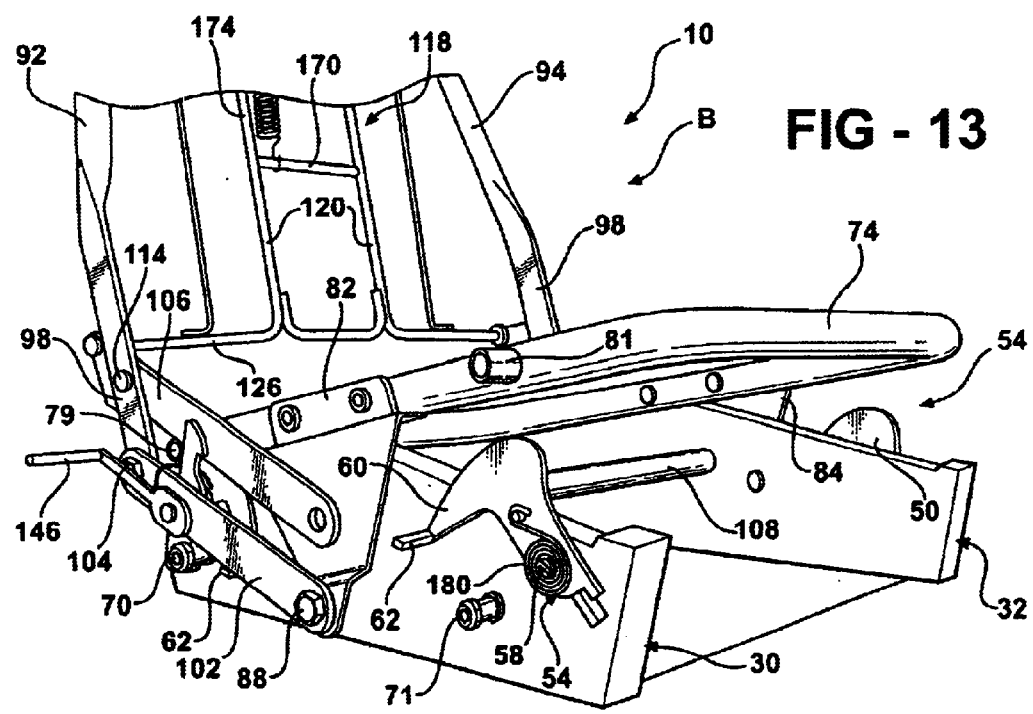
FIG. 13 is a partially broken perspective view of the seat assembly in the rearward facing and upright seating position.

From the vertical position shown in FIG. 12, the seat assembly 10 maybe positioned to any of the multiple and reversible positions A–D as shown in FIG. 1. For example, to position the seat assembly 10 in the rearward facing and upright seating position B, the latch handle 146 is continued toward the forward end 44 of the risers 30, 32. The inboard and outboard tubes 92, 94 will pivot the seat back support frame 40 about the pivot pins 104. The upper link 106 and lower link 102 lower the seat back support frame 40 toward the forward end 44 of the risers 30, 32 with the pivot pins 104 remaining spaced below the upper link 106. As the seat back support frame 40 approaches the seat cushion support 52, the lower link 102 engages the push plate 62 to rotate the support 52 clockwise about the pivot pin 56 releasing the main plate 60 from engagement with the support post 79. The seat cushion frame 38 may now pivot about the pivot rods 88 and 108 until the upper support shelf 90 of the hinge plates 82, 84 is seated and supported against the inclined surface 48 of the risers 30, 32. The outer surface of the forward hook 148 engages the locking pin 70 to rotate the latch plate 142 clockwise until the forward hook 148 passes the locking pin 70. The centering spring 160 returns the latch plate 142 to lockingly latch the forward hook 148 about the locking pin 70. Alternatively, although not shown, the latch plate 142 may be fixed to the lower link 102 and a pivotal locking pin 70 may be provide for camming engagement with the hooks 148, 150 until the hooks 148, 150 pass the locking pin 70 for positive engagement therewith. As shown in FIG. 13, the seat assembly 10 is now locked in the rearward facing and upright seating position B which is reverse of the forward facing and upright seating position A.

Figure 14:
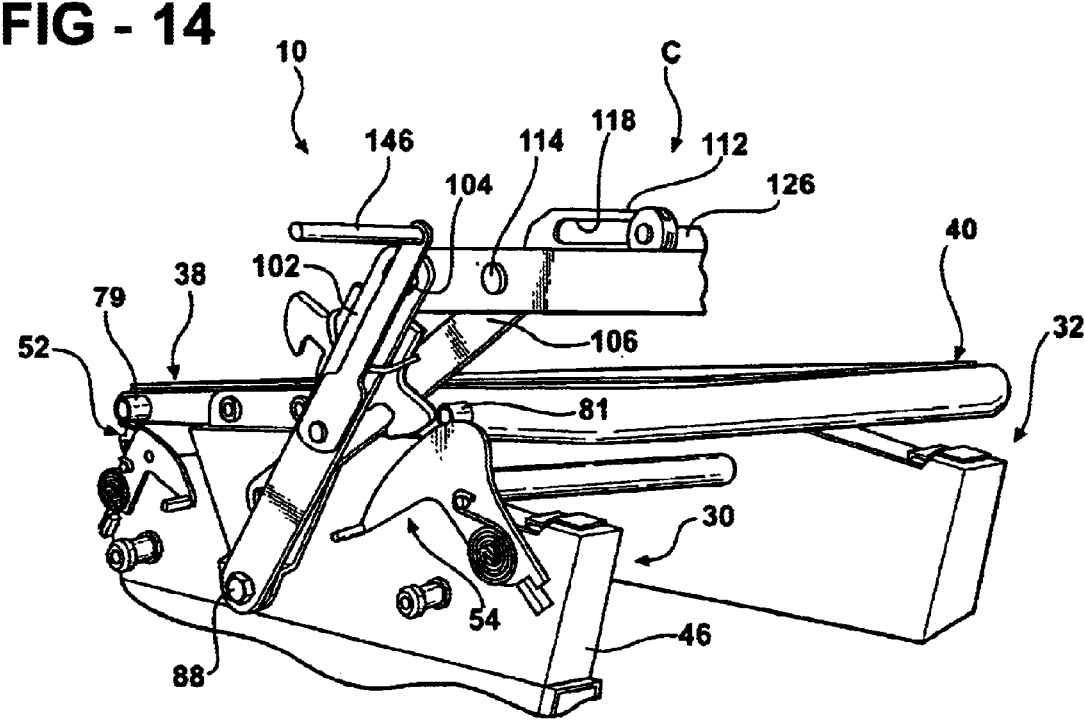
FIG. 14 is a partially broken perspective view of the seat assembly in a forward facing bed position.
Figure 15:
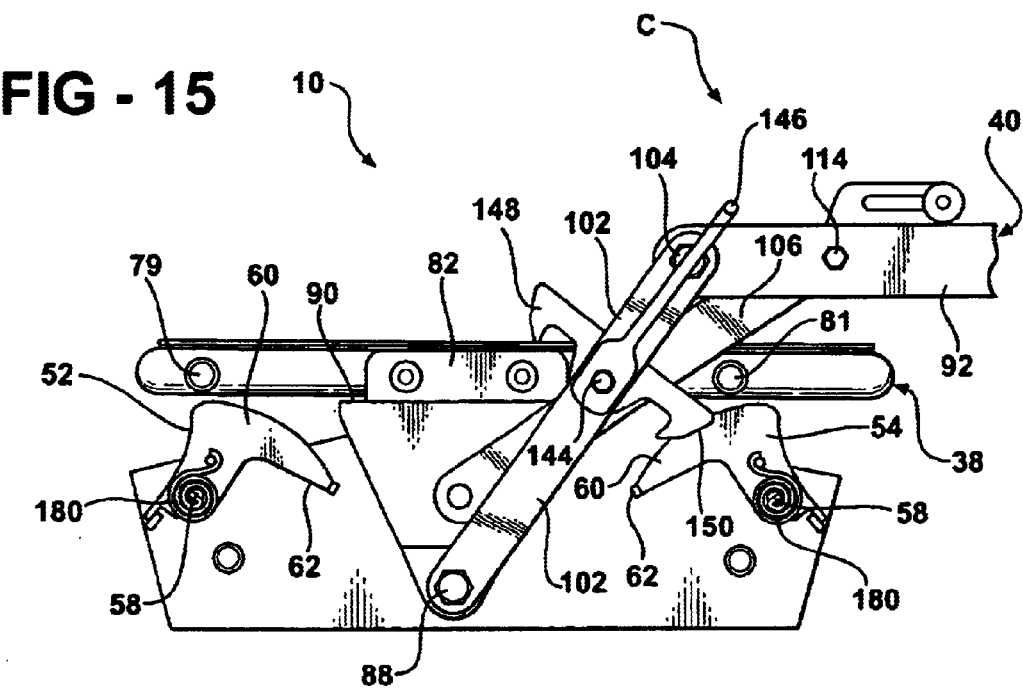
FIG. 15 is a partially broken side view of the seat assembly in the forward facing bed position.

The seat assembly 10 may also be positioned to either of the first bed position C or the second bed position D. Referring again to FIG. 12, with the seat back support frame 40 in the centered upright position as shown, the upper part of the seat back support frame 40, that is, the inboard or outboard tubes 92, 94 or the upper cross bar 100 may be moved in either direction towards the forward end 44 or rearward end 46 of the risers 30, 32. The force on the upper part of the seat back support frame 40 causes the inboard and outboard tubes 92, 94 to first pivot about the pivot pin 104 connected to the lower link 102 and then the pivot pin 114 connected to the upper link 106. The pivot pin 104 is elevated above the upper link 106 as the seat back support frame 40 is pivotally lowered toward the seat cushion support frame 38 as shown in FIGS. 14 and 15. The seat cushion support frame 38 is maintained in the horizontal position by the seat cushion supports 52, 54 engaged with the support posts 79, 81. The seat back support frame 40 is stopped in a generally horizontal position, planar and parallel to the seat cushion support frame 38 upon abutment between the upper link 106 with the support posts 81 as shown in FIG. 15. The seat back support frame 40 is thus supported in the horizontal position by a triangulated support frame comprising the lower link 102 extending from the pivot rod 88 on the hinge plates 82, 84 to the pivot pins 104 on the inboard and outboard tubes 92, 94 in addition to the upper link 106 extending from the pivot rod 108 on the hinge plates 82, 84 to the pivot pin 114 on the inboard and outboard tubes 92, 94.

Figure 16:
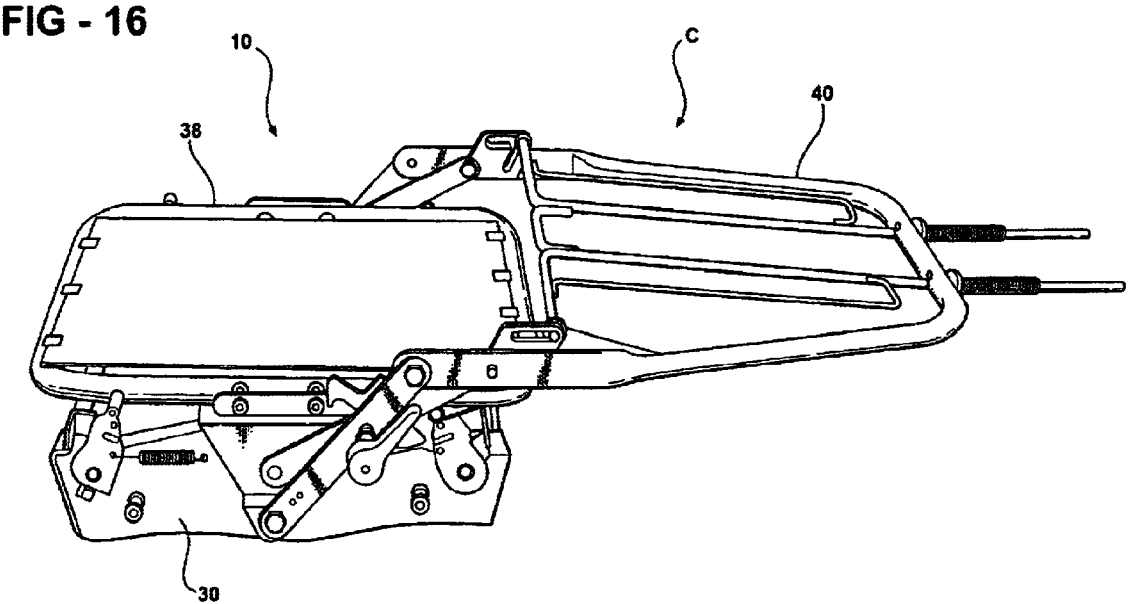
FIG. 16 is a perspective view of the seat assembly in the forward facing bed position.
Figure 17:
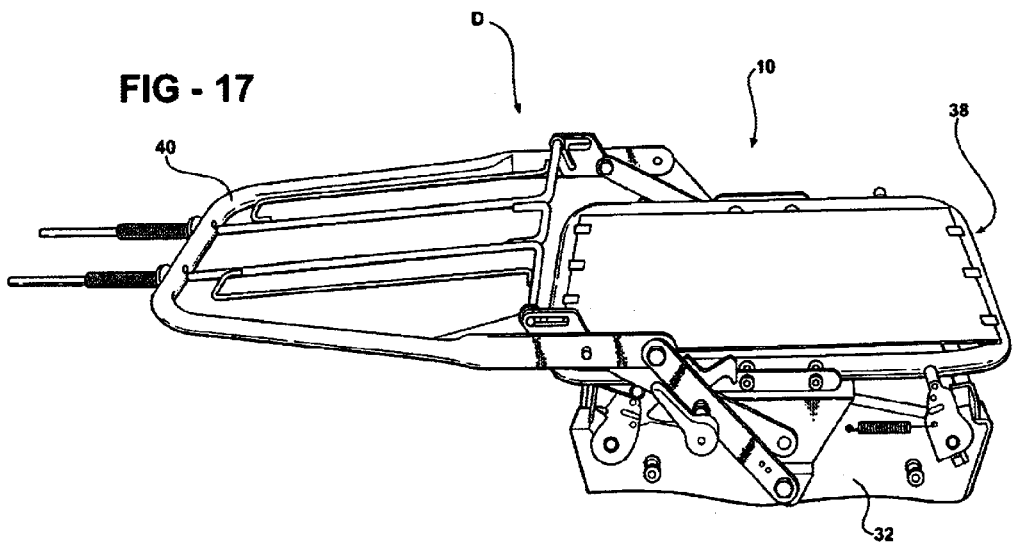
FIG. 17 is a perspective view of the seat assembly in a rearward facing bed position.

Referring to FIG. 16, the embodiment of FIGS. 2–6 is shown in the first bed position C. Similarly, FIG. 17 shows the embodiment of FIGS. 2–6 in the second bed position D, which is a reverse of the first bed position C.

Referring to FIG. 18, the inner suspension support frame 118 also provides additional suspension to the seat assembly 10 in the first bed position C and the second bed position D. Specifically, with the seat back support frame 40 supported by the support posts 79 or 81 in the horizontal position, the cross bar 126 of the inner suspension support frame 118 is free to slide downwardly from the point, or apex, of the V-shaped slot 116 in the upper link 106 to the end of the slot 116. The slot 116 is angled away from the horizontal position of the support bars 120 such that the sliding movement of the cross bar 126 in the slot 116 is pulling against the biasing force of the springs 130 or 174. Therefore, the cross bar 126 is still bias toward the point of the V-shaped slot 116 by the springs 130 or 174. The springs 130 or 174 thus provide a resilient suspension in the support bars 120 and cross bar 126 between the inboard and outboard tubes 92,94 when the seat assembly is in the first bed position C or the second bed position D.

Referring to FIG. 19, the inner suspension support frame 118 also provides an anti-whiplash mechanism when the seat assembly 10 is in either the forward facing and upright seating position A or the rearward facing and upright seating position B. Specifically, if a force F is exerted on the support bars 120 or cross bar 126, the bars 120 will deform rearward behind the inboard and outboard tubes 92, 94. The cross bar 126 is maintained in the V-shaped slots 116 of the upper links 106. The deformation of the bars 120 pulls the bars downwardly through the openings in the upper cross tube 100 against the force of the springs 130 or 174. The slots 125 in the cross tube 100 also allow the first ends 122 of the support bars 120 to pivot forwardly, or in the clockwise direction as shown in FIG. 19, about the upper cross tube 100. Since the upper, or first ends 122, of the support bars 120 support the head restraint 26, the head restraint 26 will pivot toward the head of the seat occupant to reduce the distance between the occupants head and the head restraint and absorb energy from the impact force F.

Figure 20:
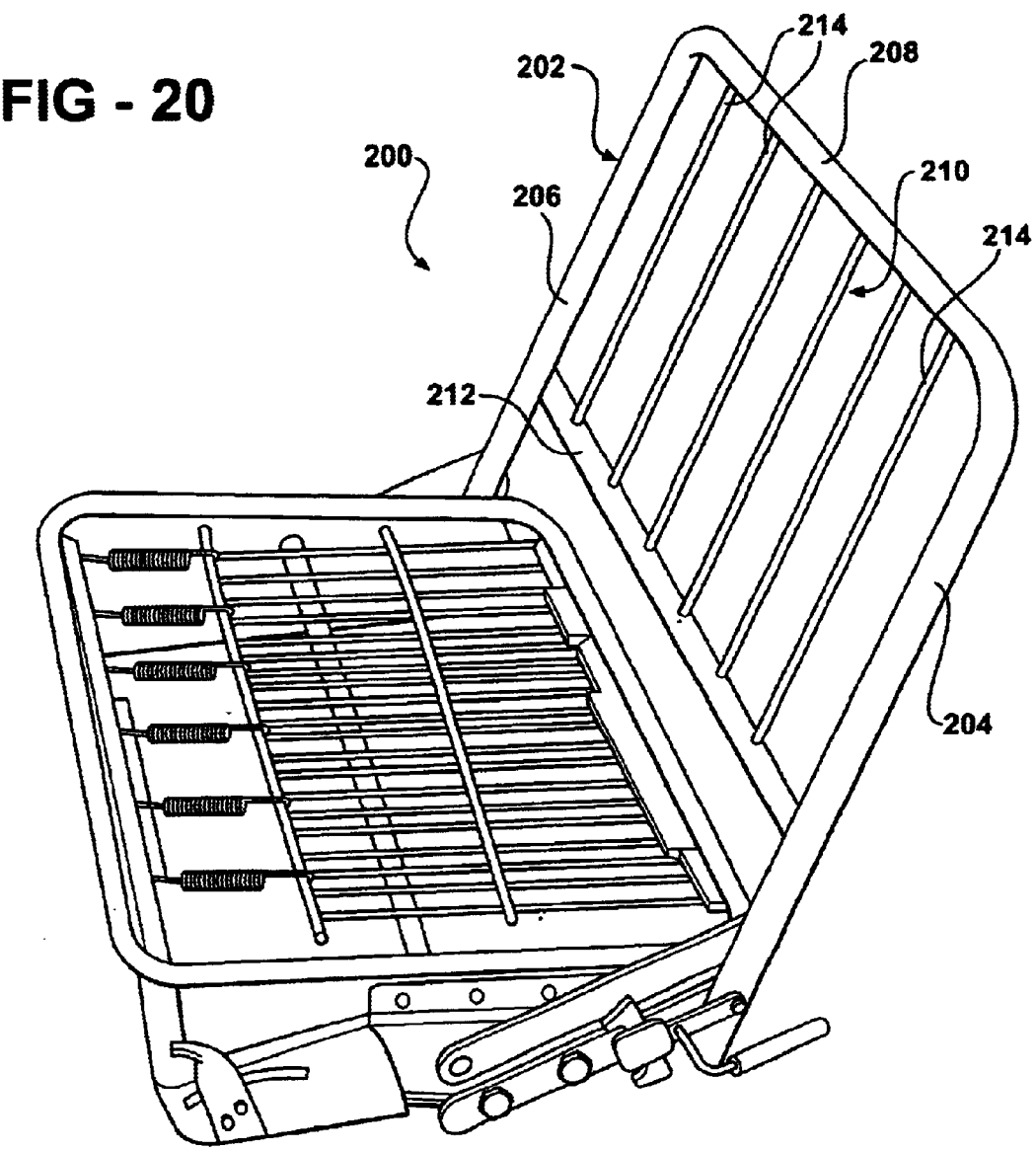
FIG. 20 is a perspective view of a bench type multi-positionable and reversible seat assembly in a forward facing and upright seating position.

FIG. 20 illustrates a bench-type seat assembly 200 that is also multi-positionable and reversible between the various positions A–D. The seat assembly 200 similarly includes a generally U-shaped seat back support frame 202 having inboard and outboard tubes 204, 206 and an upper cross tube 208. The seat back support frame 202, however, includes a fixed inner support frame 210. The inner support frame 210 includes cross bar 212 fixedly secured between the inboard and outboard tubes 204, 206. The inner support frame 210 also includes a plurality of elongated support bars 214 spaced apart between the inboard and outboard tubes 204, 206 and fixedly secured between the cross bar 212 and the upper cross tube 208. The seat back support frame 202 may be covered by a resilient cellular foam pad encased in a trim cover as conventionally known to one skilled in the art.

Figure 21:
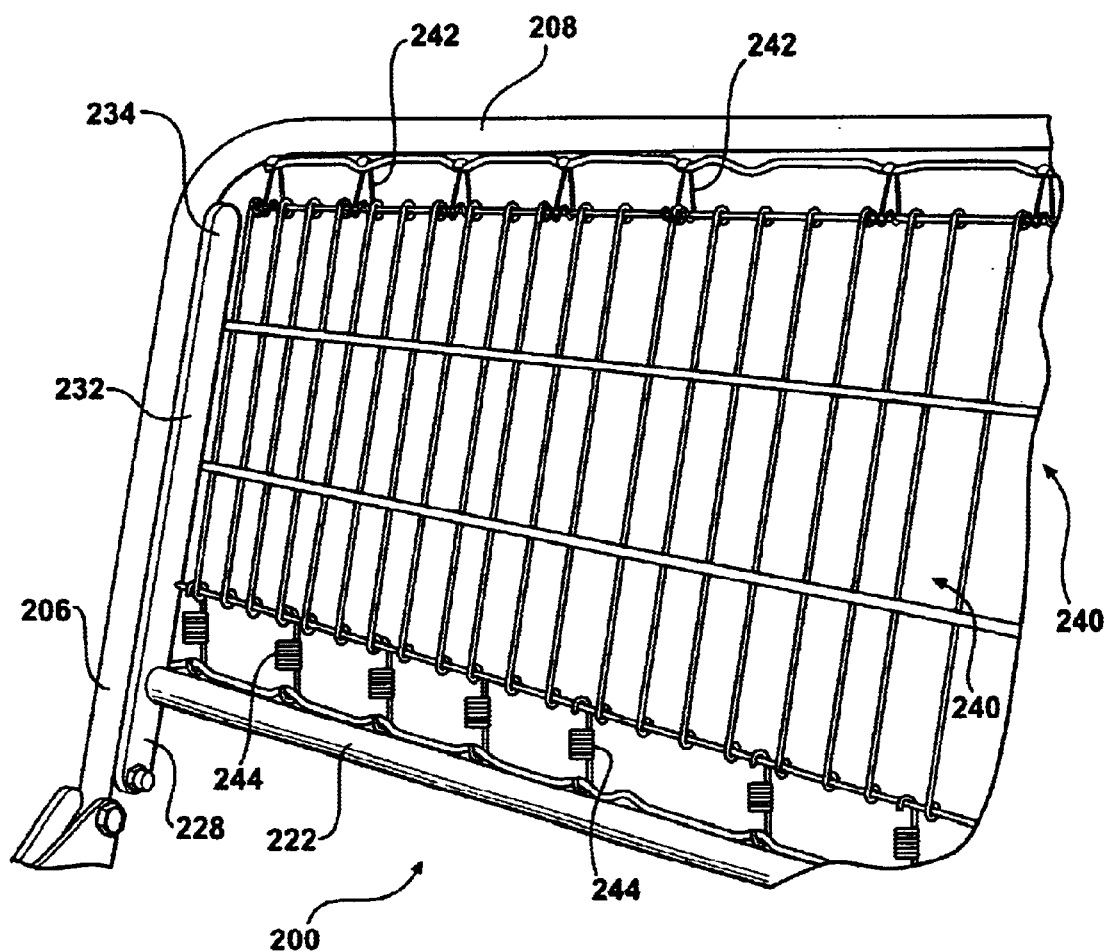
FIG. 21 is a partially broken perspective view of the seat back and inner suspension support of the bench type seat assembly of FIG. 20.

FIGS. 21 and 22 disclose an alternative inner support frame 220 for the bench-type seat assembly 200. The inner support frame 220 includes a cross bar 222 having first and second end and extending between the distal ends of the inboard tube 204 and the outboard tube 206. A pivot shaft 224 project axially outwardly from the ends of the cross bar 222. The inner support frame 220 further includes a pair of pivot links 226, 228. The pivot link 226 has a first end pivotally connected to the distal end of the inboard tube 204 and a second end pivotally coupled to the pivot shaft 224 on the end of the cross bar 222. The pivot link 228 similarly has a first end pivotally connected to the distal end of the outboard tube 206 and a second end pivotally coupled to the pivot shaft 224 on the opposite end of the cross bar 222. The inner support frame 220 also includes a pair of support links 230, 232 each having a first end 234 and a second end 236. The first ends 234 of the links 230, 232 are pivotally connected to the respective inboard and outboard tubes 204, 206 adjacent the upper cross tube 208. The second ends 236 include an elongated slot 238 for slidably receiving the pivot shaft 224 therethrough from the respective opposite ends of the cross bar 222. The inner support frame 220 also includes an inner suspension frame 240 comprising a plurality of interconnected wire rods commonly referred to in the art as "flexolator". The inner suspension frame 240 extends between the inboard and outboard tubes 204, 206 and between the upper cross tube 208 and the cross bar 222. The suspension frame 240 is coupled to the upper cross tube 208 by a plurality of looped hooks 242 to allow pivotal movement of the upper portion of the suspension frame 240. The lower portion of the suspension frame 240 is coupled to the cross bar 222 by a plurality of compression springs 244. The springs 244 bias the inner support frame 220 into planar alignment with the inboard and outboard tubes 204, 206 as shown in FIG. 21. The inner support frame 220 provides a resilient and pivotal seat back suspension in the seat assembly 200. Specifically, in operation and as shown in FIG. 22, when a seat occupant applies a load or force against the inner support frame 220, the pivot links 226, 228 allow the cross bar 222 to move rearward, or behind the inboard and outboard tubes 204, 206. The support links 230, 232 pivot about their first ends 234 and allow the pivot shafts 224 on the ends of the cross bar 22 to translate along the elongated slots 238 against the biasing force of the compression springs 244.

The invention has been described in an illustrative manner, and it is to be understood that the terminology, which has been used, is intended to be in the nature of words of description rather than of limitation.

Obviously, many modification and variations of the present invention are possible in light of the above teachings. It is, therefore, to be understood that within the scope of the appended claims, the invention may be practiced other than as specifically described.

What is claimed is:

1. A multi-positionable and reversible seat assembly (10) comprising:
    a pair of risers (30, 32) having upper inclined surfaces (48, 50) and a bottom surface (42);
    a seat back (14) coupled to the pair of risers (30, 32);
    a seat cushion (12) coupled to the pair of risers (30, 32), the seat cushion (12) including a seat cushion support frame (38) comprising a pair of seat cushion supports (52, 54) pivotally coupled to the pair of risers (30, 32), the seat cushion supports (52, 54) having a main plate (60) pivotally secured to the risers (30, 32) and a push plate (62) extending from the main plate (60).

2. The multi-positionable and reversible seat assembly (10) of claim 1 wherein the main plate (60) comprises a L-shaped member.

3. The multi-positionable and reversible seat assembly (10) of claim 1 wherein the main plate (60) comprises a J-shaped member.

4. The multi-positionable and reversible seat assembly (10) of claim 1 further including a return spring (64) connected between the main plate (60) and the risers (30, 32) for biasing the seat cushion (12) in a desired direction.

5. The multi-positionable and reversible seat assembly (10) of claim 1 further including a nub (68) protruding from the risers (30, 32) below the seat cushion supports (52, 54) for abutting with a lower portion of the main plate (60); thereby limiting rotation of the seat cushion supports (52, 54) about pivot pins (56, 58).

6. The multi-positionable and reversible seat assembly (10) of claim 1 further including hinge plates (82, 84) connected to the pair of risers (30, 32), the hinge plates (82, 84) comprising triangular members having a lower apex (86) for receiving a pivot rod (88) associated with the risers (30, 32).

7. The muiti-positionable and reversible seat assembly (10) of claim 6 wherein the hinge plates (82, 84) include an upper shelf (90) for supporting the seat cushion support frame (38) on the inclined surfaces (48, 50) of the pair of risers (30, 32).

8. The multi-positionable and reversible seat assembly (10) of claim 6 further including a seat back support frame (40) comprising inboard (92) and outboard (94) tubes operatively connected to the seat cushion (12), and an upper cross tube (100) connected between the inboard (92) and outboard (94) tubes.

9. The multi-positionable and reversible seat assembly (10) of claim 8 further including an elongated lower link (102) connected between a lower distal end (98) of the inboard (92) and outboard (94) tubes and the lower apex (86) of the hinge plate (82, 84).

10. The multi-positionable and reversible seat assembly (10) of claim 9 wherein a pivot pin (104) couples the lower elongated link (102) to the inboard and outboard tubes (92, 94), and a pivot rod (88) couples the elongated lower link (102) to the lower apex (86) of the hinge plates (82, 84).

11. The multi-positionable and reversible seat assembly (10) of claim 8 further including an elongated upper link (106) having a first end pivotally coupled to the hinge plate (82, 84) between the apex (86) and the upper support shelf (90) by a pivot rod (108) extending between the hinge plates (82, 84) and risers (30, 32), and a second end of the upper link (106) forming a bulbous portion (112).

12. The multi-positionable and reversible seat assembly (10) of claim 11 wherein the lower distal ends (98) of the inboard (92) and outboard (94) tubes are pivotally coupled to the upper link (106) by a pivot pin (114) adjacent the bulbous portion (112).

13. The multi-positionable and reversible seat assembly (10) of claim 11 wherein the bulbous portion (112) includes a V-shaped slot (116) formed therein such that a point of the V-shape is adjacent the second end of the upper link (106) and opening towards the first end of the upper link (106).

14. The multi-positionable and reversible seat assembly (10) of claim 1 wherein the seat back (14) further includes an inner suspension support frame (118) connected between the seat back support frame (38) and the upper link (106), the inner suspension support frame (118) comprising support bars (120) positioned parallel to the inboard (92) and outboard (94) tubes and extending through slots formed in the upper cross tube (100), the support bars (120) connected to a cross bar (126).

15. The multi-positionable and reversible seat assembly (10) of claim 14 further including a first brace (170) interconnecting the support bars (120) between the cross bar (126) and the upper cross tube (100), and a second brace (172) extending from the upper cross tube (100), and a tension spring (174) connected to and extending between the first (170) and second (172) braces for biasing the cross bar (126) towards the upper cross tube (100).

16. The multi-positionable and reversible seat assembly (10) of claim 14 wherein the cross bar (126) is received in the V-shaped slot (116) formed in the bulbous portion (112).

17. The multi-positionable and reversible seat assembly (10) of claim 14 further including coil springs (130) seated around the support bars (120) and secured to the upper cross tube (100) for biasing the cross bar (126) toward the V-shaped slot (116).

18. The multi-positionable and reversible seat assembly (10) of claim 1 further including a latch mechanism (140) comprising a latch plate (142) seated between the lower (102) and upper (106) links, the latch plate (142) pivotally connected to the lower link (102) by a pivot shaft (144).

19. The multi-positionable and reversible seat assembly (10) of claim 18 wherein the latch mechanism (14) further includes a latch handle (146) secured to the pivot shaft (144) for rotating the pivot shaft (144) and latch plate (142).

20. The multi-positionable and reversible seat assembly (10) of claim 18 wherein the latch plate (142) includes forward (148) and rearward (150) hook portions.

21. The multi-positionable and reversible seat assembly (10) of claim 18 wherein the latch plate (142) includes an arcuate slot (152) formed therein for receiving a guide pin (154) extending from the lower link (102).

22. The multi-positionable and reversible seat assembly (10) of claim 21 wherein the latch mechanism (140) includes a centering plate (156) attached to the pivot shaft (144), the centering plate (156) having a centering spring (160) coupled to the pivot shaft (144) for maintaining a centered position of the latch plate (142), wherein the guide pin (154) is positioned midway between ends of the arcuate slot (152).

23. The multi-positionable and reversible seat assembly (10) of claim 18 wherein the forward hook portion (148) is engageable with a locking pin (70) when the seat assembly (10) is in a rearward facing, upright position and wherein the rearward hook portion (150) is engageable with a locking pin (71) when the seat assembly (10) is in a forward facing, upright position.

24. The multi-positionable and reversible seat assembly (10) of claim 2 further including a coil spring (180) secured between a pivot pin (56, 58) and the main plate (60) for biasing the seat cushion (12) in a desired direction.

25. The multi-positionable and reversible seat assembly (10) of claim 1 further including a seat back support frame (202) having inboard and outboard tubes (204, 206) and an upper cross tube (208) connected between the inboard and outboard tubes (204, 206).

26. The multi-positionable and reversible seat assembly (10) of claim 25 further including a fixed inner support frame (210) having a cross bar (212) secured between the inboard and outboard tubes (204, 206) and a plurality of elongated support bars (214) spaced apart between the inboard and outboard tubes (204, 206) and secured between the cross bar (212) and the upper cross tube (208).

27. The multi-positionable and reversible seat assembly (10) of claim 25 further including an inner support frame (220) having a cross bar (222) extending between the inboard or outboard tubes (204, 206) and a pivot shaft (224) projecting axially outward from the cross bar (222).

28. The multi-positionable and reversible seat assembly (10) of claim 27 further including a pair of pivot links (226, 228) having a first end connected to the inboard or outboard tube (204, 206) and a second end coupled to the pivot shaft (224).

29. The multi-positionable and reversible seat assembly (10) of claim 28 further including a pair of support links (230, 232) connected at a first end (234) to the inboard or outboard tube (204, 206) adjacent the upper cross tube (208) and having a second end (236) having an elongated slot (238) formed therein for receiving the pivot shaft (224).

30. The multi-positionable and reversible seat assembly (10) of claim 29 further including an inner suspension frame (240) having a plurality of interconnected wire rods.

31. The multi-positionable and reversible seat assembly (10) of claim 30 wherein the inner suspension frame (240) is coupled to the upper cross tube (208) by a plurality of looped hooks (242) for allowing pivotal movement of an upper portion of the inner suspension frame (240), and a lower portion of the inner suspension frame (240) coupled to the cross bar (222) by a plurality of compression springs (244).

32. A multi-positionable and reversible seat assembly (10) comprising:

a pair of risers (30, 32) having upper inclined surfaces (48, 50) and a bottom surface (42);

a seat back (14) coupled to the pair of risers (30, 32);

a seat cushion (12) coupled to the pair of risers (30, 32), hinge plates (82, 84) connected to the pair of risers (30, 32), the hinge plates (82, 84) comprising triangular members having a lower apex (86) for receiving a pivot rod (88) associated with the risers (30, 32).

33. A multi-positionable and reversible seat assembly (10) comprising:

a pair of risers (30, 32) having upper inclined surfaces (48, 50) and a bottom surface (42);

a seat cushion (12) coupled to the pair of risers (30, 32), a seat back (14) coupled to the pair of risers (30, 32), the seat back (14) including an inner suspension support frame (118) connected between a seat back support frame (38) and an upper link (106), the inner suspension support frame (118) comprising support bars (120) positioned parallel to inboard (92) and outboard (94) tubes and extending through slots formed in an upper cross tube (100), the support bars (120) connected to a cross bar (126).

* * * * *